(12) United States Patent
Nishimura et al.

(10) Patent No.: US 11,260,915 B2
(45) Date of Patent: Mar. 1, 2022

(54) VEHICLE SIDE BODY STRUCTURE

(71) Applicant: Mazda Motor Corporation, Hiroshima (JP)

(72) Inventors: Yoshikazu Nishimura, Hiroshima (JP); Takeshi Nakamura, Hiroshima (JP); Daisuke Kiyoshita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 60 days.

(21) Appl. No.: 16/814,063

(22) Filed: Mar. 10, 2020

(65) Prior Publication Data

US 2020/0317276 A1    Oct. 8, 2020

(30) Foreign Application Priority Data

Apr. 4, 2019    (JP) .............................. JP2019-071817

(51) Int. Cl.
*B62D 25/16*    (2006.01)
*B62D 25/04*    (2006.01)
*B62D 25/02*    (2006.01)

(52) U.S. Cl.
CPC ............ *B62D 25/16* (2013.01); *B62D 25/025* (2013.01); *B62D 25/04* (2013.01)

(58) Field of Classification Search
CPC ........ B62D 25/16; B62D 25/04; B62D 25/02; B62D 25/025; B62D 27/023

USPC ......... 296/193.06, 198, 209, 203.01, 203.03, 296/203.04, 29, 30
See application file for complete search history.

(56) References Cited

FOREIGN PATENT DOCUMENTS

| JP | 3827061 B2 | * | 9/2006 |
| JP | 2016043765 A | | 4/2016 |
| JP | 6172211 B2 | * | 8/2017 |

* cited by examiner

*Primary Examiner* — Dennis H Pedder
(74) *Attorney, Agent, or Firm* — Alleman Hall Creasman & Tuttle LLP

(57) ABSTRACT

A vehicle side body structure can secure a vibration-damping property of a body regardless of design specification by including a rear wheel house including a wheel house outer and a wheel house inner; a side sill extending forward from a front end of the wheel house outer; and an outer reinforcement extending in a vertical direction along a door opening edge from an intermediate portion in a front-rear direction of the wheel house outer. The wheel house outer includes: an outer overhang overhanging outward; and an outer flange extending upward from an inner end of the outer overhang. A reinforcing member is provided to cooperate with the outer overhang and the outer flange so as to define a closed cross section in a substantially triangular shape. The reinforcing member couples a rear end of the side sill and a lower end of the outer reinforcement.

7 Claims, 7 Drawing Sheets

VEHICLE SIDE BODY STRUCTURE

TECHNICAL FIELD

The present invention relates to a vehicle side body structure.

BACKGROUND ART

Conventionally, in order to secure a vibration-damping property of a body, rigidity of a body frame member that constitutes a portion around a door opening is increased.

In general, the portion around the door opening that is formed on a side portion of a vehicle is provided with: a rear wheel house configured to include a rear wheel house outer and a rear wheel house inner; a side sill that extends forward in the body from a front end of the rear wheel house outer; a pillar outer member that extends in a body vertical direction from an intermediate portion in a body front-rear direction of the rear wheel house outer; and the like.

A vehicle side structure in Patent document 1 includes: a rocker (also referred to as the side sill) that extends in the body front-rear direction; a rocker outer reinforcement that reinforces an outer portion in a vehicle width direction of this rocker; a quarter pillar that extends in the body vertical direction from a position behind the rocker; a quarter pillar reinforcement that reinforces this quarter pillar; and a reinforcing member that couples the rocker outer reinforcement and the quarter pillar reinforcement and cooperates with the rear wheel house inner to define a closed cross section in a substantially rectangular shape.

PRIOR ART DOCUMENTS

Patent Documents

Patent document 1: JP 2016-043765A

SUMMARY OF THE INVENTION

Problem to be Solved by the Invention

In the vehicle side structure in Patent document 1, although the reinforcing member defines the closed cross section in the substantially rectangular shape that contributes to body rigidity, the rear wheel house is possibly twisted and deformed.

More specifically, the rear wheel house receives a travel load in a vertical direction via a damper support section of a rear suspension, a force in an inward-falling direction thereby acts on the rear wheel house, and a cross section of the reinforcing member is deformed to a rhombic shape (so-called matchbox deformation) due to this force in the inward-falling direction. In such a case, the rear wheel house is twisted and deformed.

In addition, depending on a body specification from a design request, there is a possibility that an arrangement space for the reinforcing member cannot be secured.

For example, in the case where an engine is vertically arranged in an engine bay in a body front portion, it is necessary to increase a distance between a front wheel and a hinge pillar, which moves the entire door opening rearward. As a result, a clearance between a rear door opening edge and an outer overhang of the rear wheel house outer is reduced.

Thus, it is difficult to arrange the rectangular closed cross section defined by the reinforcing member and the rear wheel house inner.

An object of the present invention is to provide a vehicle side body structure and the like capable of securing a vibration-damping property of a body regardless of a body specification.

Means for Solving the Problem

A vehicle side body structure according to a first aspect includes: a rear wheel house configured to include a rear wheel house outer and a rear wheel house inner; a side sill extending forward from a front end of the rear wheel house outer; a pillar extending in a body vertical direction along a rear door opening edge from an intermediate portion in a body front-rear direction of the rear wheel house outer. The wheel house outer includes: an outer overhang that overhangs outward in a vehicle width direction; and an outer flange that extends upward from an inner end in the vehicle width direction of the outer overhang, and a reinforcing member is provided to cooperate with the outer overhang and the outer flange so as to define a closed cross section in a substantially triangular shape.

In this vehicle side body structure, the rear wheel house outer includes: the outer overhang that overhangs outward in the vehicle width direction; and the outer flange that extends upward from the inner end in the vehicle width direction of the outer overhang. The reinforcing member is provided to cooperate with the outer overhang and the outer flange so as to define the closed cross section in the substantially triangular shape. Accordingly, even in a body specification in which a clearance between the rear door opening edge and the outer overhang of the wheel house outer is small, it is possible to secure a space for defining the closed cross section along the outer overhang. In addition, the reinforcing member cooperates with the outer overhang and the outer flange to define the closed cross section in the substantially triangular shape. Accordingly, even in the case where a force in an inward-falling direction acts on the rear wheel house, it is possible to prevent the closed cross section, which is defined by the reinforcing member, from being modified to a matchbox shape, and thus it is possible to avoid twisted deformation of the rear wheel house.

In the invention according to the first aspect, the invention according to a second aspect is characterized in that the wheel house inner includes: an inner overhang that overhangs inward in the vehicle width direction; and an inner flange that extends upward from an inner end in the vehicle width direction of the inner overhang and is joined to the outer flange in a surface contact state, and the reinforcing member includes an opening that communicates between inside and outside of the closed cross section. With this configuration, after the closed cross section defined by the reinforcing member is defined, the opening is used as a work hole for a welding electrode to perform so-called close joining of the outer flange and the inner flange, and thus rigidity can be improved.

In the invention according to the second aspect, the invention according to a third aspect is characterized in that a joined portion between the outer flange and the inner flange is disposed in a manner to correspond to the opening when seen in a side view. With this configuration, it is possible to easily join the outer flange and the inner flange via the opening.

In the invention according to the second or third aspects, the invention according to a fourth aspect is characterized that the reinforcing member includes a plurality of the openings, and, of the plurality of the openings, a high-rigid portion is formed between the respective adjacent openings. With this configuration, by maintaining the rigidity of the reinforcing member, it is possible to secure workability of the joining work while increasing rigidity of the closed cross section in the substantially triangular shape.

In the invention according to the fourth aspect, the invention according to a fifth aspect is characterized in that the high-rigid portion is a bead that is formed in a substantially orthogonal manner to the outer overhang when seen in the side view. With this configuration, it is possible to further increase the rigidity in the vehicle width direction of the reinforcing member.

In the invention according to any one of the first to fifth aspects, the invention according to a sixth aspect is characterized in that the reinforcing member couples a rear end of the side sill and a lower end of the pillar outer member, and constitutes a part of a side ring-shaped structure, which continues from the rear door opening edge and is substantially orthogonal to the vehicle width direction, together with a closed cross section defined by the side sill, a closed cross section defined by a front pillar, which extends in the body vertical direction along a front door opening edge, a closed cross section defined by the roof side rail, and a closed cross section defined by the pillar, which extends in the body vertical direction along the rear door opening edge. With this configuration, a load received by the rear wheel house can be dispersed to the side ring-shaped structure that constitutes a portion around the rear door opening edge. Thus, it is possible to suppress vibrations of the body.

Advantage of the Invention

With the vehicle side body structure according to the present invention, it is possible to secure a vibration-damping property of the body regardless of a design specification by using the reinforcing member that defines the closed cross section in the substantially rectangular shape.

MODES FOR CARRYING OUT THE INVENTION

Figure 1:
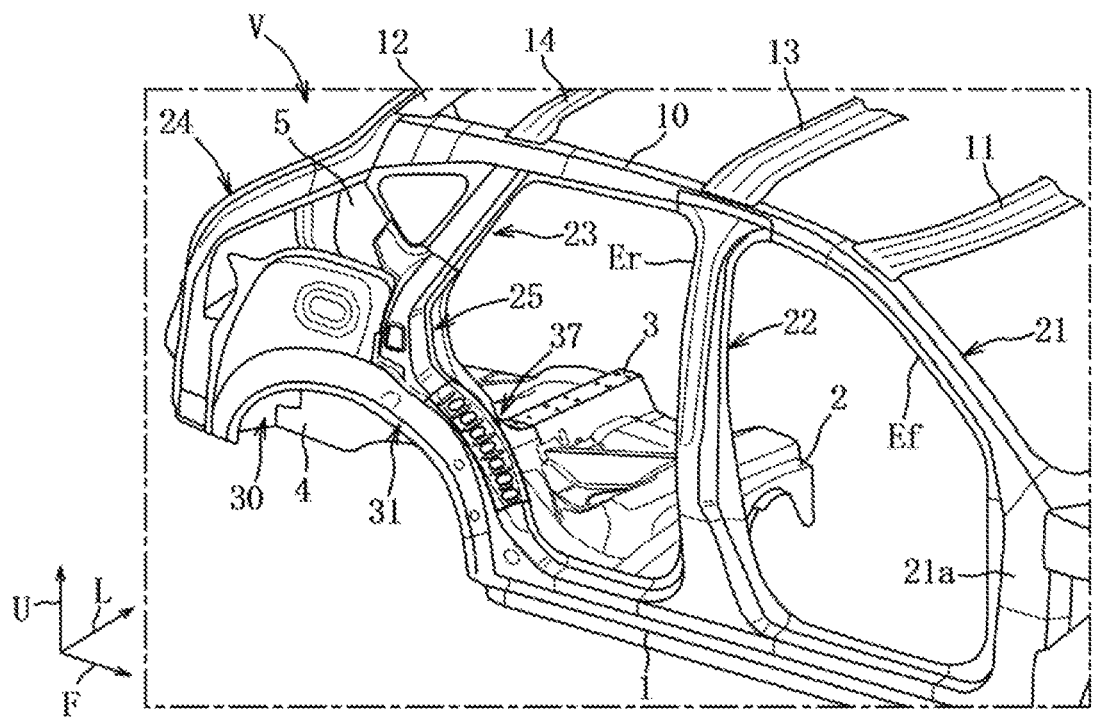
FIG. 1 is a perspective view of an outer side in a vehicle width direction of a vehicle according to a first embodiment.
Figure 2:
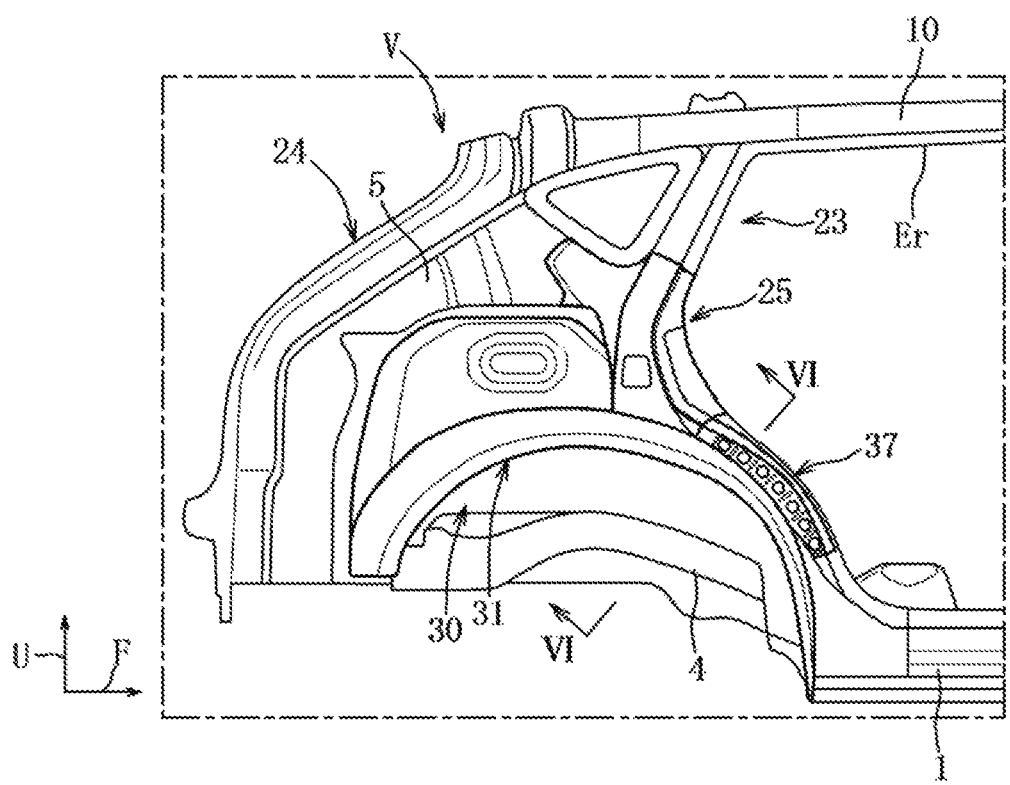
FIG. 2 is a side view of a rear portion on the outer side in the vehicle width direction.

A description will hereinafter be given for a mode for carrying out the invention with reference to the drawings. The following description of a preferred embodiment is essentially and merely illustrative, and thus, has no intention to limit the invention, application subjects thereof, and application thereof.

First Embodiment

A description will hereinafter be given for a first embodiment of the present invention with reference to FIG. 1 to FIG. 13.

A vehicle V according to this first embodiment is a front-engine, rear-wheel-drive (FR) automobile that includes an engine (not illustrated) vertically arranged in an engine room in front of a cabin and is driven by rear wheels.

Hereinafter, a description will be made by setting an arrow F direction as forward in a body front-rear direction, an arrow L direction as leftward in a vehicle width direction, and an arrow U direction as upward in a body vertical direction in the drawings. In addition, this vehicle V has a bilaterally symmetrical structure. Thus, hereinafter, a description will mainly be given for right members and right portions unless otherwise noted.

An overall configuration will be described first.

As illustrated in FIG. 1 to FIG. 4, the vehicle V includes: a right and left pair of side sills 1, each of which extends in the front-rear direction; a floor panel 2 that is hung between these side sills 1 and constitutes a cabin floor surface; a right and left pair of roof side rails 10, each of which extends in the front-rear direction; right and left sets of A to D pillars 21 to 24, each of which extends downward from the roof side rail 10; a right and left pair of rear wheel houses 30, each of which is coupled to a lower end of the C pillar 23; and the like.

The side sill 1 is configured to include an outer member and an inner member, each of which is formed by pressing a steel sheet, and both of the members cooperate with each other to define a substantially straight closed cross section that extends in the front-rear direction.

A lower end of a hinge pillar 21a that corresponds to a lower half portion of the A pillar 21 is connected to a front-end portion of the side sill 1. A lower end of the B pillar 22 is connected to an intermediate portion of the side sill 1.

The A pillar 21, a front portion of the roof side rail 10, the B pillar 22, and a front portion of the side sill 1 form a door opening edge Ef for a front door (not illustrated).

A front-end portion of the rear wheel house 30 is connected to a rear end portion of the side sill 1.

The B pillar 22, a rear portion of the roof side rail 10, the C pillar 23, and a front portion of the rear wheel house 30, and a rear portion of the side sill 1 form a door opening edge Er for a rear door (not illustrated).

A kick-up section that is inclined upward to the rear is formed in a rear portion of the floor panel 2.

A crossmember 3 that couples the rear wheel houses 30 is provided on top of the kick-up section. This crossmember 3 has a substantially crank-shaped cross section and cooperates with an upper surface of the floor panel 2 to define a closed cross section that extends in a right-left direction and has a substantially rectangular shape.

The floor panel 2 is formed with a spare tire pan that is recessed downward at a position behind the crossmember 3 and between a pair of rear side frames 4.

As illustrated in FIG. 1 to FIG. 4, the roof side rails 10 are disposed at right and left ends of a roof panel (not illustrated) and include a front and rear pair of headers 11, 12, two roof reinforcements 13, 14, and the like.

The front header 11 couples front ends of the roof side rails 10, and the rear header 12 couples rear ends of the roof side rails 10. A right and left pair of hinges (not illustrated) for opening/closing a lift gate (not illustrated) are mounted on the rear header 12.

The front roof reinforcement 13 is arranged at a position to couple upper ends of the B pillars 22 in the right-left direction. The rear roof reinforcement 14 is arranged at a position to couple upper ends of the C pillars 23 in the right-left direction. Each of these roof reinforcements 13, 14 cooperates with the roof panel to define a closed cross section that extends in the right-left direction.

Next, a description will be given for the C pillar 23.

As illustrated in FIG. 1 to FIG. 4, the C pillar 23, which corresponds to a quarter pillar, is formed to be tilted upward to the front and separates a rear door opening and a quarter window from each other in the front-rear direction.

As illustrated in FIG. 5 to FIG. 10, the C pillar 23 includes: an outer reinforcement 25 (a pillar outer member) that is a pillar outer-side reinforcing member; an inner reinforcement 26 (a pillar inner member) that is a pillar inner-side reinforcing member; a connecting member 27; and the like.

The outer reinforcement 25 is formed of a high-tensile steel sheet having a thickness of 0.9 mm, for example, and is disposed in a manner to extend downward from an intermediate portion of the C pillar 23, more specifically, a position corresponding to a lower end of the quarter window to an outer overhang 33, which will be described later.

As illustrated in FIG. 5 to FIG. 7 and FIG. 10, the outer reinforcement 25 includes: a side surface 25a that is substantially orthogonal to a right-left direction; a front wall 25b that extends leftward from a front end of the side surface 25a; a rear wall 25c that extends leftward from a rear end of the side surface 25a; and the like, and is formed to have a substantially hat-shaped cross section.

In this outer reinforcement 25, both flanges 25f that are formed at left ends of the front wall 25b and the rear wall 25c are joined to a right surface (an outer surface in the vehicle width direction) of a side panel 5 by welding. The outer reinforcement 25 cooperates with the side panel 5 to define a first closed cross section C1 that extends in a vertical direction.

The first closed cross section C1 is configured to continue with the door opening edge Er and partially follows a rear end portion of the door opening edge Er.

As illustrated in FIG. 1, FIG. 2, FIG. 5, and FIG. 6, a lower end of the outer reinforcement 25 is joined to an upper surface of the outer overhang 33 by welding.

A striker 28 (see FIG. 10), with which a latch mechanism (not illustrated) provided on the rear door can be engaged, is attached to the outer reinforcement 25.

As illustrated in FIG. 5 to FIG. 10, an attachment plate 29 that fixes the striker 28 is fixed to a rear surface of the front wall 25b. A fixture section that is formed in an intermediate portion of the attachment plate 29 is joined to a welding position P1 set in the front wall 25b by welding.

The inner reinforcement 26 is formed of a cold-rolled steel sheet having a thickness of 1.2 mm, for example, and is disposed in a manner to extend downward from the intermediate portion of the C pillar 23 to a brace 41 of a suspension housing 40.

As illustrated in FIG. 6 to FIG. 8 and FIG. 10, the inner reinforcement 26 includes: a side surface 26a that is substantially orthogonal to the right-left direction; a front wall 26b that extends rightward from a front end of the side surface 26a; a rear wall 26c that extends rightward from a rear end of the side surface 26a; and the like, and is formed to have a substantially hat-shaped cross section.

In this inner reinforcement 26, both flanges 26f that are formed at right ends of the front wall 26b and the rear wall 26c are joined to a left surface (an inner surface in the vehicle width direction) of the side panel 5 by welding. The inner reinforcement 26 cooperates with the side panel 5 to define a second closed cross section C2 that extends in the vertical direction.

The second closed cross section C2 is configured to continue with the rear roof reinforcement 14 via an upper half portion of the C pillar 23 and partially follows the rear end portion of the door opening edge Er.

Figure 3:
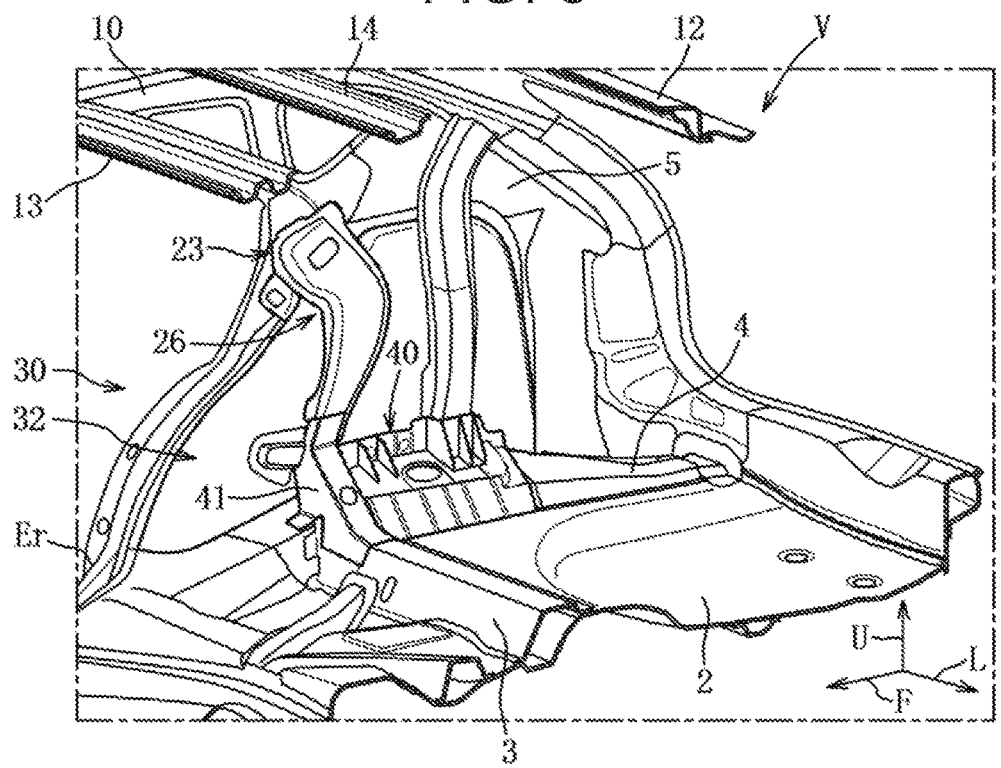
FIG. 3 is a perspective view of an inner side in the vehicle width direction.
Figure 4:
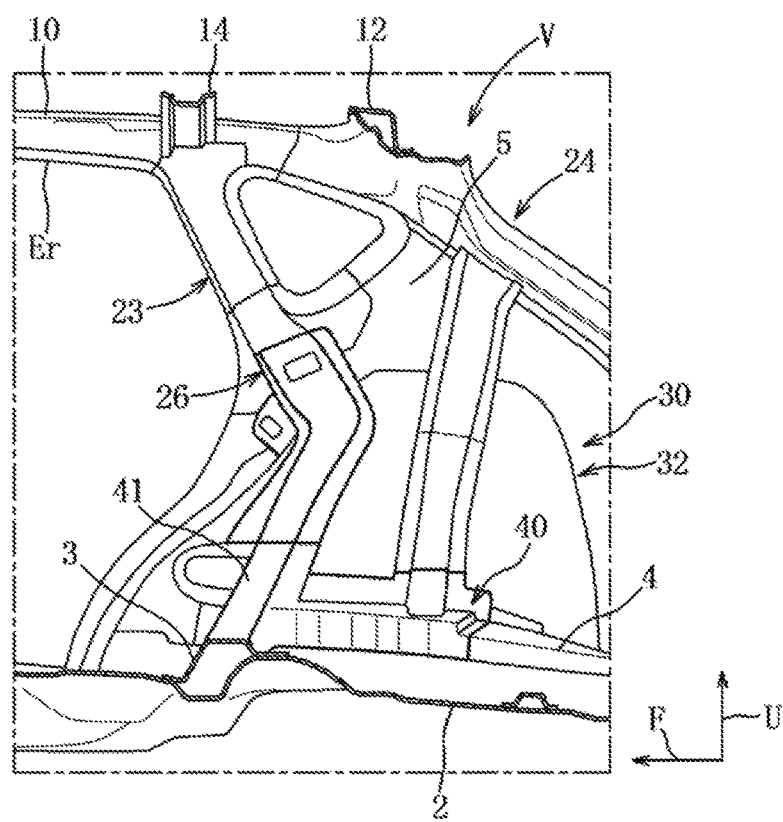
FIG. 4 is a side view of a rear portion on the inner side in the vehicle width direction.
Figure 6:
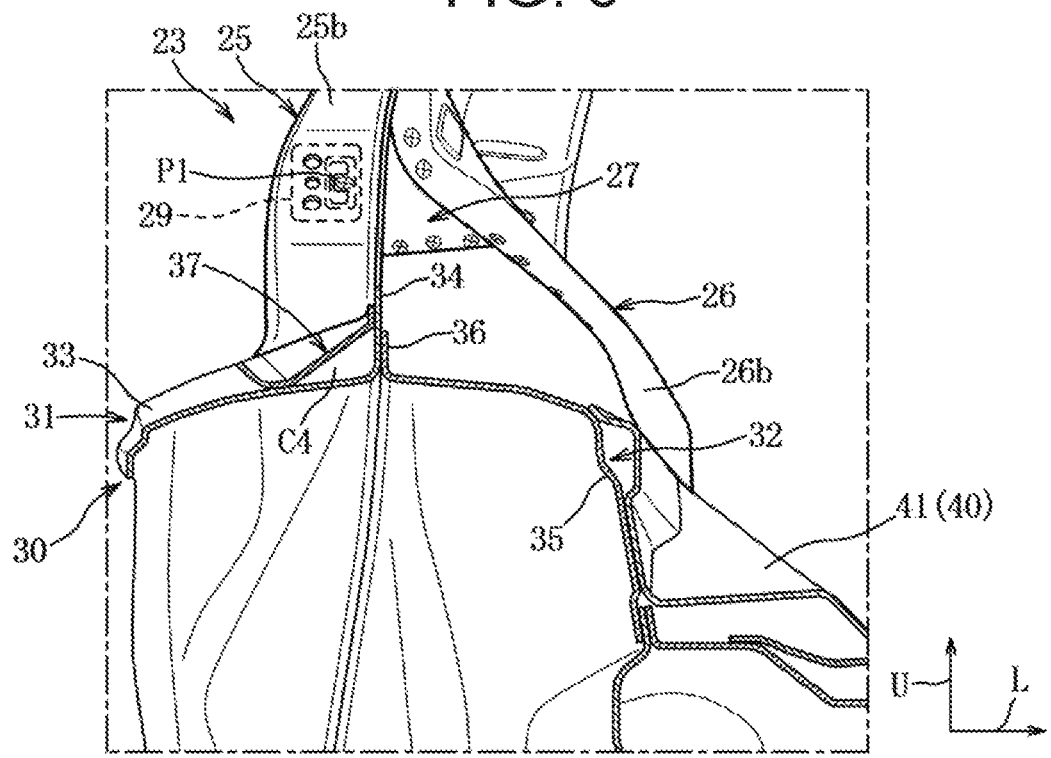
FIG. 6 is a cross-sectional view that is taken along line VI-VI in FIG. 2.
Figure 7:
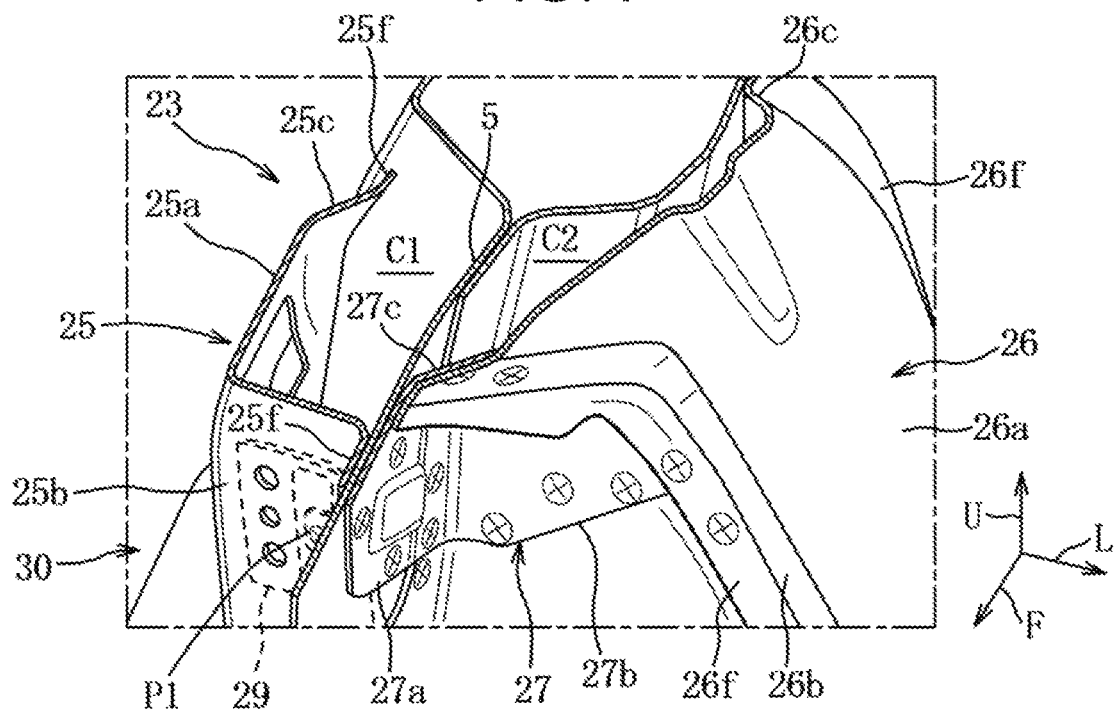
FIG. 7 is a cross-sectional view that is taken along line VII-VII in FIG. 5.

As illustrated in FIG. 3, FIG. 4, and FIG. 6, a lower end of the inner reinforcement 26 is joined to an upper end portion of the brace 41 by welding.

Here, a description will be given for the suspension housing 40.

As illustrated in FIG. 3, the suspension housing 40 is configured to connect a damper support section (not illustrated) of a rear suspension to the rear side frame 4.

This suspension housing 40 is a member that is made of an aluminum alloy and shaped by die-casting, for example, and includes the brace 41 as a reinforcing section.

The brace 41 is arranged to be substantially orthogonal to the front-rear direction, and is integrally formed in a front-end portion of the suspension housing 40.

This brace 41 has a substantially hat-shaped cross section and cooperates with a left surface of a wheel house inner 32, which will be described later, to define a closed cross section that extends in the vertical direction and has a substantially rectangular shape.

A lower end of this brace 41 is joined to a right end of the crossmember 3 by welding.

Figure 11:
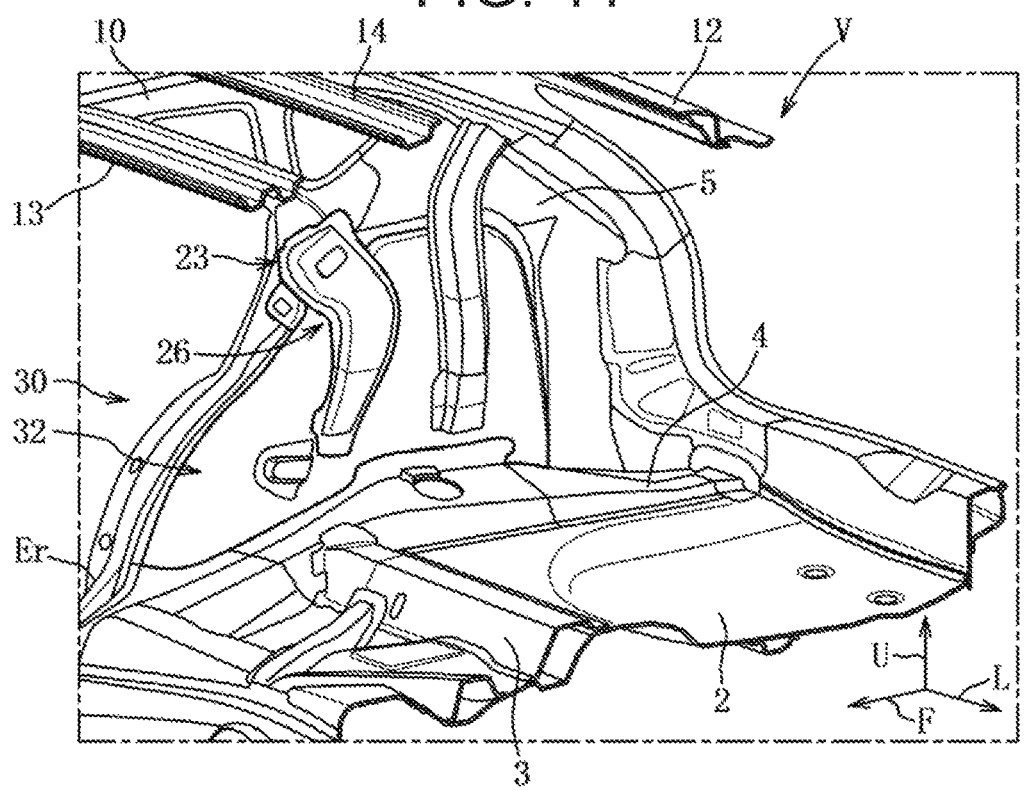
FIG. 11 is a view in which a suspension housing in FIG. 3 is not illustrated.

As illustrated in FIG. 11, the lower end of the inner reinforcement 26 and the right end of the crossmember 3 separate from each other in the vertical direction. However, since both of the members are coupled to each other via the brace 41, the second closed cross section C2 defined by the inner reinforcement 26 and the closed cross section defined by the crossmember 3 are connected to each other via the closed cross section defined by the brace 41.

Next, a description will be given for the connecting member 27.

As illustrated in FIG. 6 to FIG. 10, the connecting member 27 is formed of a cold-rolled steel sheet having a thickness of 1.2 mm, for example, and is arranged at a position adjacent to a left side of the attachment plate 29.

The connecting member 27 includes: a side wall 27a that is substantially orthogonal to the right-left direction; a horizontal wall 27b that is substantially orthogonal to the vertical direction; and a vertical wall 27c that is substantially orthogonal to the front-rear direction.

A projection that is projected leftward is partially formed in an intermediate area of the side wall 27a.

In this way, the side wall 27a cooperates with a left surface of a wheel house outer 31, which will be described later, to define a third closed cross section C3.

The side wall 27a is joined to the front flange 25f of the outer reinforcement 25 and the wheel house outer 31 at two welding positions P2, is joined to the wheel house outer 31 and the wheel house inner 32 at two welding positions P3, is joined to the wheel house outer 31 at a welding position P4, and is joined to the wheel house outer 31 and the front flange 26f of the inner reinforcement 26 at a welding position P5.

The two welding positions P2 of the side wall 27a are set at a substantially same height as a height position of the welding position P1 of the attachment plate 29.

Figure 8:
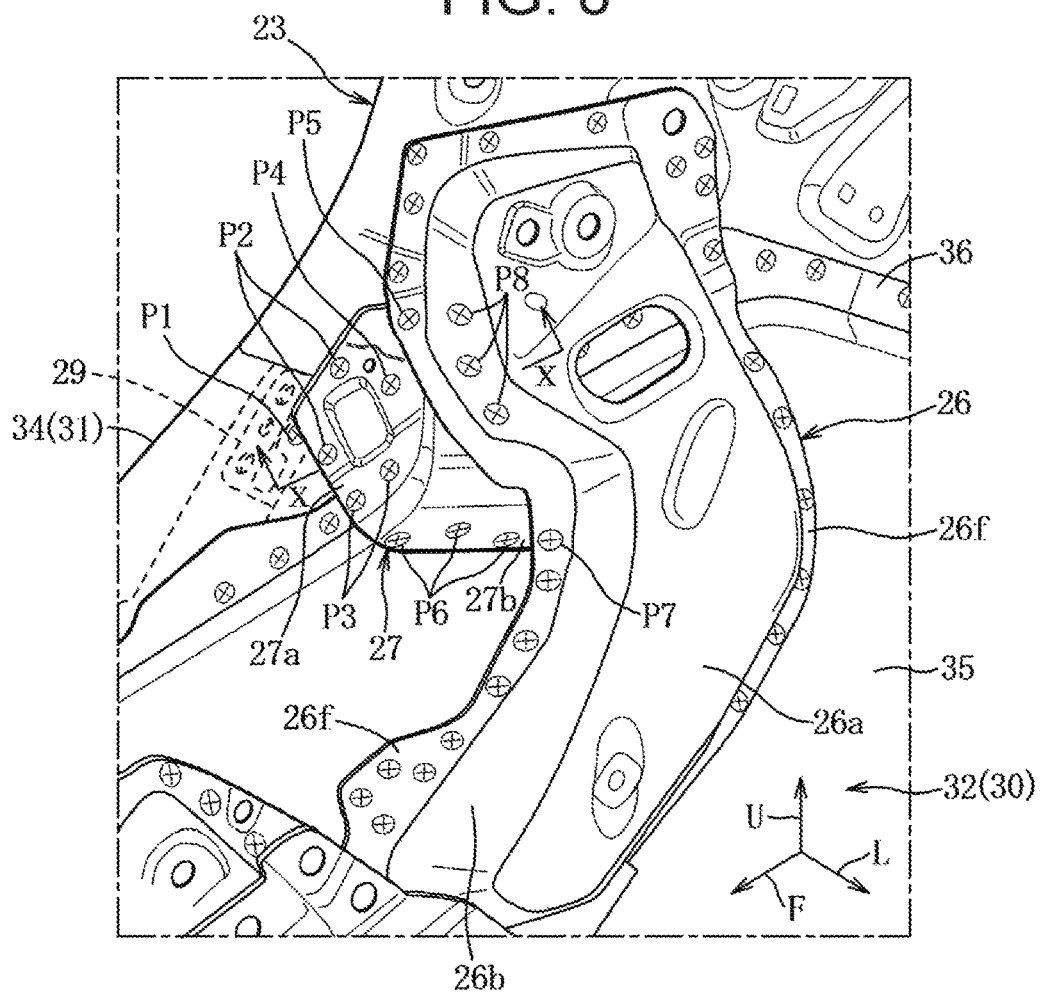
FIG. 8 is an enlarged view of a main section in FIG. 3.
Figure 9:
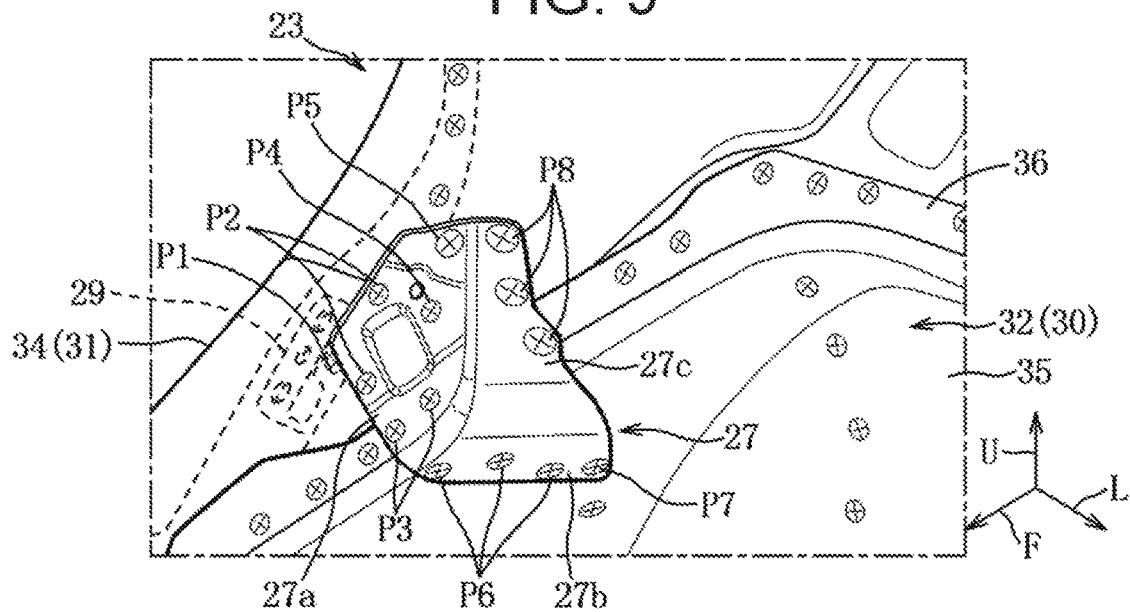
FIG. 9 is an enlarged view of a main section in which an inner reinforcement in FIG. 8 is not illustrated.

As illustrated in FIG. 8 and FIG. 9, the horizontal wall 27b is joined to the wheel house inner 32 at three welding positions P6, and is joined to the wheel house inner 32 and the front flange 26f of the inner reinforcement 26 at a welding position P7. The vertical wall 27c is joined to the front wall 26b of the inner reinforcement 26 at three welding positions P8.

Next, a description will be given for the rear wheel house 30.

As illustrated in FIG. 1 to FIG. 4, the rear wheel house 30 includes: the wheel house outer 31 that is bulged rightward (outward in the vehicle width direction) from the side panel 5; and the wheel house inner 32 that is bulged leftward (inward in the vehicle width direction) from the side panel 5.

Figure 5:
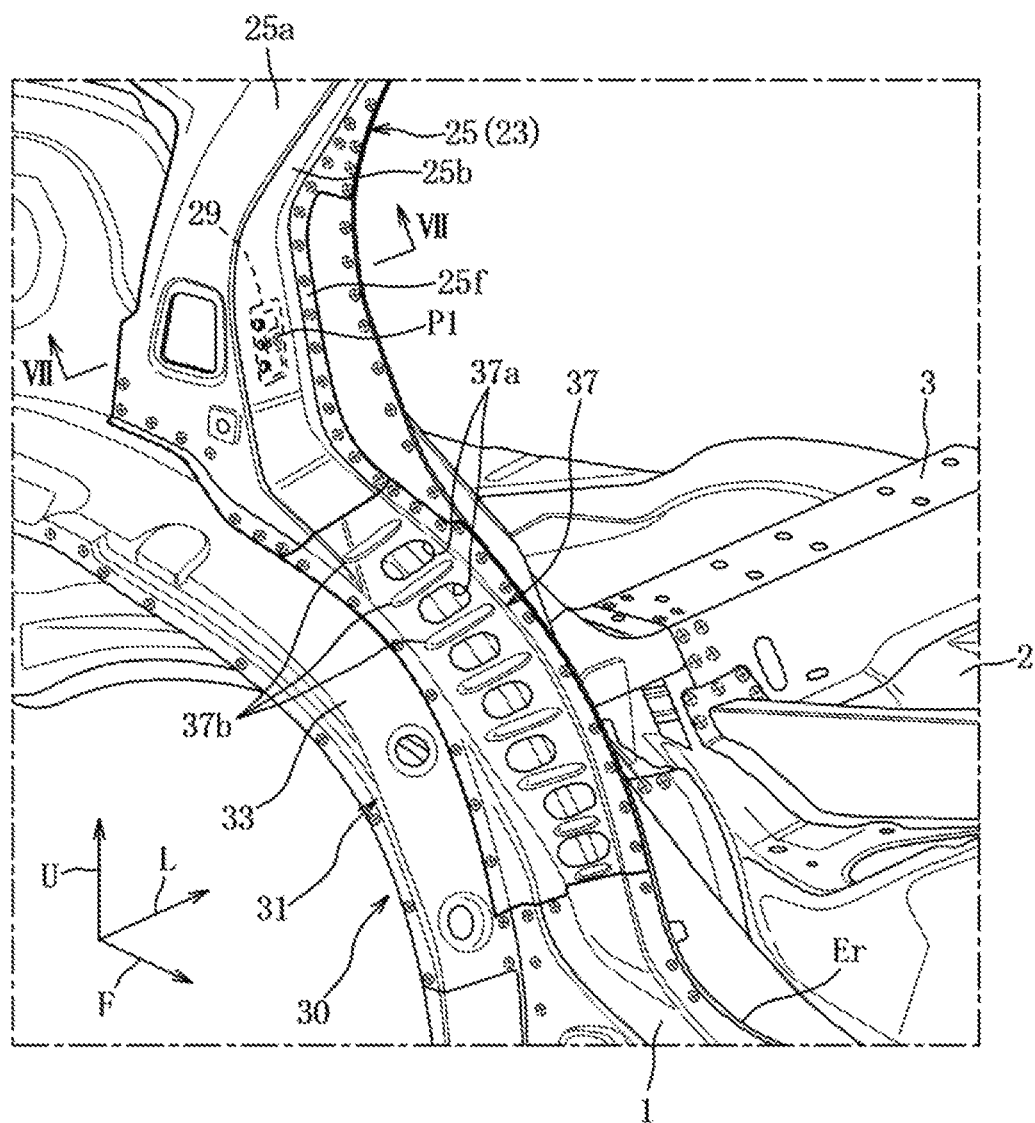
FIG. 5 is an enlarged view of a main section in FIG. 1.

As illustrated in FIG. 5 and FIG. 6, the wheel house outer 31 is formed of a cold-rolled steel sheet having a thickness of 0.6 mm, for example, and includes: the outer overhang 33 in a substantially semicircular shape when seen in a side view; and an outer flange 34 that extends upward from a left end of this outer overhang 33 and has a vertical wall shape.

A front portion of the outer flange 34 is formed along a rear portion of the door opening edge Er.

A rear portion of the outer flange 34 is integrally constructed with a lower half portion of the side panel 5, and is joined to a lower end of an upper half portion of the side panel 5 by welding.

Figure 10:
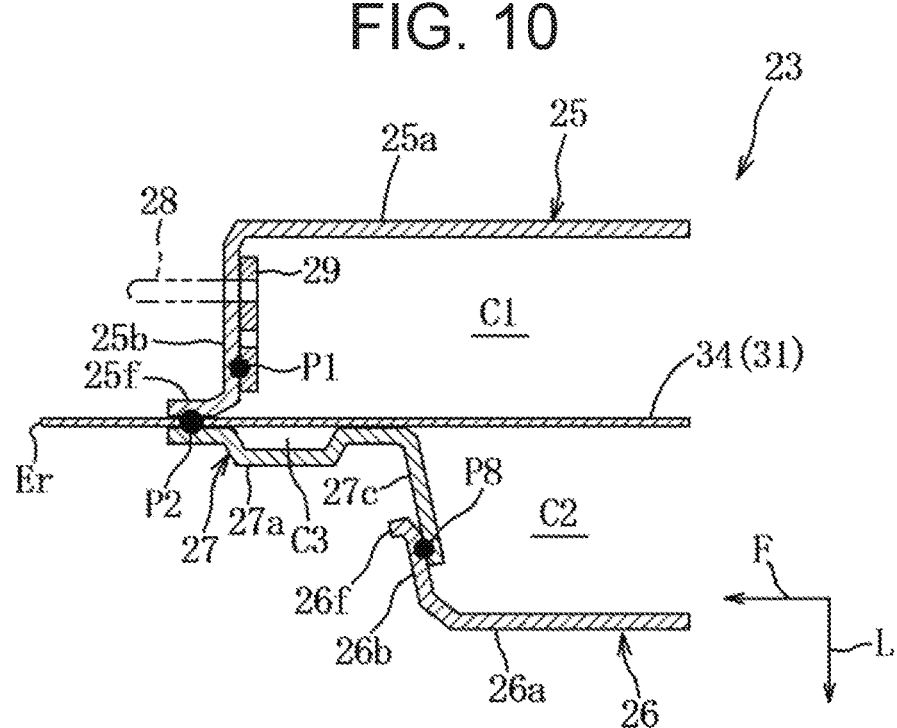
FIG. 10 is a cross-sectional view that is taken along line X-X in FIG. 8.

Accordingly, as illustrated in FIG. 8 to FIG. 10, the outer flange 34 is joined at the welding positions P2 in a state of being held between the front flange 25f and the side wall 27a, and is joined to the side wall 27a at the welding position P4. In addition, the outer flange 34 and the side wall 27a hold an inner flange 36 therebetween at the welding positions P3, and the outer flange 34 and the front flange 26f hold the side wall 27a therebetween at the welding position P5.

As illustrated in FIG. 6, FIG. 8, and FIG. 9, the wheel house inner 32 is formed of a cold-rolled steel sheet having a thickness of 0.65 mm, for example, and includes: an inner overhang 35 in a substantially half-bowl shape when seen in the side view; and the inner flange 36 that extends upward from a right end of this inner overhang 35 and has a substantially arcuate shape.

In a state where the right end of the inner overhang 35 substantially matches the left end of this outer overhang 33, a right surface of the inner flange 36 is joined to a left surface of the outer flange 34 in a surface contact state by welding.

As illustrated in FIG. 1, FIG. 2, FIG. 5, and FIG. 6, a reinforcing member 37 that follows a curved shape of the wheel house outer 31 (the rear portion of the door opening edge Er) is disposed in a front portion of the wheel house outer 31.

The reinforcing member 37 is formed of a high-tensile steel sheet having a thickness of 0.8 mm, for example, and cooperates with the outer overhang 33 and the outer flange 34 to define a fourth closed cross section C4 that is a triangular cross section.

An upper portion of the reinforcing member 37 is joined to the front portion of the outer flange 34, and a lower portion of the reinforcing member 37 is joined to a front portion of the outer overhang 33. Furthermore, the front portion of the reinforcing member 37 is joined to a rear end upper portion of the side sill 1 by welding, and the rear portion of the reinforcing member 37 is joined to a lower end front portion of the outer reinforcement 25 by welding. After the fourth closed cross section C4 defined by the reinforcing member 37 is defined, the outer flange 34 and the inner flange 36 are joined to each other via an opening 37a.

As illustrated in FIG. 5, the reinforcing member 37 includes a plurality of, for example, seven openings 37a and a plurality of, for example, eight (8) beads 37b.

The opening 37a in a substantially oval shape is formed to communicate between inside and outside of the fourth closed cross section C4.

When the outer flange 34 and the inner flange 36 are welded, a welding electrode is inserted through the fourth closed cross section C4 via the opening 37a.

Each of the beads 37b is configured to be recessed in the fourth closed cross section C4. The beads 37b are formed at positions where the beads 37b are substantially orthogonal to (arranged radially with respect to) the outer overhang 33 when seen in the side view.

Each of these beads 37b are disposed between the adjacent openings 37a. In other words, the adjacent beads 37b are disposed in a manner to hold the opening 37a therebetween.

Figure 12:
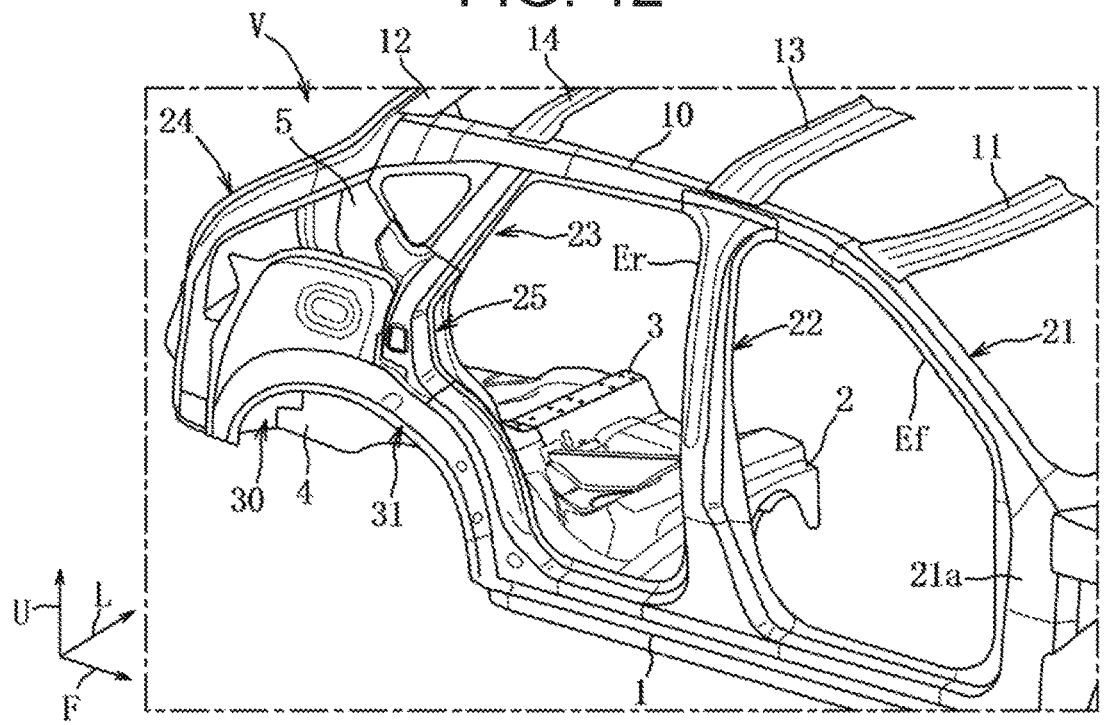
FIG. 12 is a view in which a reinforcing member in FIG. 1 is not illustrated.

As illustrated in FIG. 12, the lower end of the outer reinforcement 25 and a rear end of the side sill 1 separate from each other. However, since both of the members are coupled to each other via the reinforcing member 37, the first closed cross section C1 defined by the outer reinforcement 25 and the closed cross section defined by the side sill 1 are connected to each other via the fourth closed cross section C4 defined by the reinforcing member 37.

Like the description so far, the vehicle V has a right and left pair of first ring-shaped structures S1 (side ring-shaped structures) and a second ring-shaped structure S2 that couples rear portions of these first ring-shaped structures S1.

Figure 13:
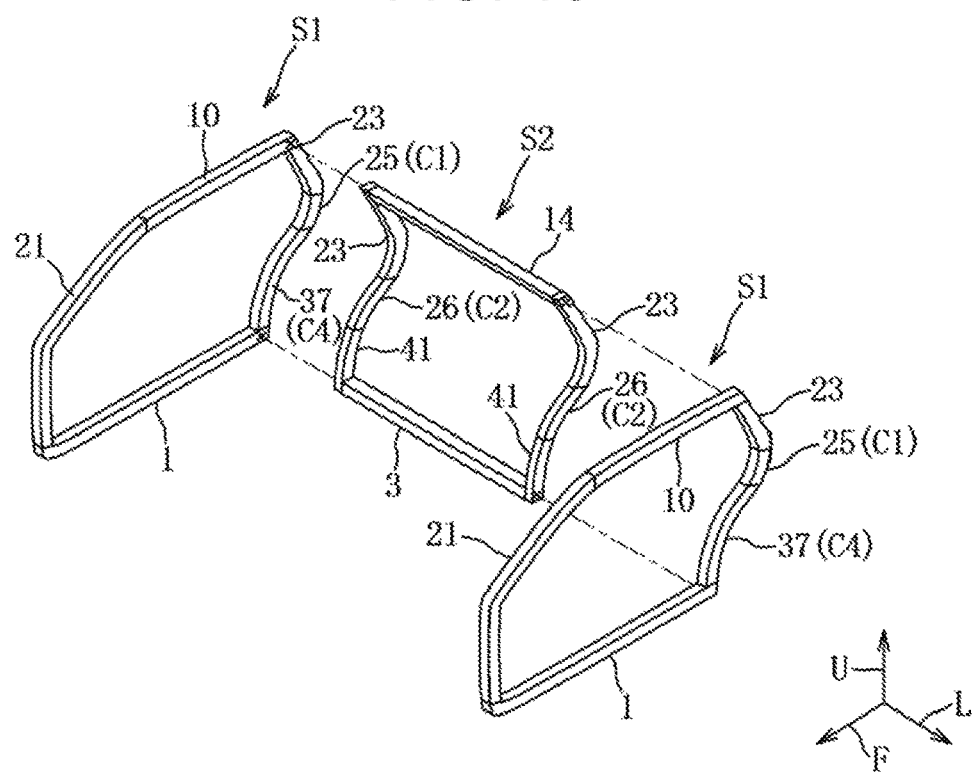
FIG. 13 is an explanatory view of a first ring-shaped structure and a second ring-shaped structure.

As illustrated in FIG. 13, each of the first ring-shaped structures S1 constitutes a door opening that is arranged in a substantially orthogonal manner to the right-left direction.

The first ring-shaped structure S1 is configured to include the closed cross section defined by the side sill 1, the closed cross section defined by the A pillar 21, the closed cross section defined by the roof side rail 10, the closed cross section defined by the C pillar 23, the first closed cross section C1 defined by the outer reinforcement 25, and the fourth closed cross section C4 defined by the reinforcing member 37.

The second ring-shaped structure S2 is arranged in a manner to be substantially orthogonal to the front-rear direction.

The second ring-shaped structure S2 is configured to include the closed cross section defined by the right and left pair of the C pillars 23, the second closed cross section C2 defined by the right and left pair of the inner reinforcements 26, the closed cross section defined by the right and left pair of the braces 41, the closed cross section defined by the crossmember 3, and the closed cross section defined by the rear roof reinforcement 14.

In this way, a load that is received by the suspension housing 40 is transferred by the first and second ring-shaped structures S1, S2 as load paths and is dispersed to each frame member.

Meanwhile, an opening/closing load of the rear door is transferred from the striker 28 (the attachment plate 29) to the roof side rail 10 via the outer reinforcement 25, is also transferred to the inner reinforcement 26 via the connecting member 27, and is dispersed to the second ring-shaped structure S2 side.

Next, a description will be given for action and effects of the side body structure described above.

In the side body structure according to the first embodiment, the wheel house outer 31 includes: the outer overhang 33 that overhangs outward in the vehicle width direction; and the outer flange 34 that extends upward from an inner end in the vehicle width direction of the outer overhang 33, and the reinforcing member 37 is provided to cooperate with the outer overhang 33 and the outer flange 34 so as to define the closed cross section in a substantially triangular shape. Accordingly, even in a body specification in which a clearance between the door opening edge Er and the outer overhang 33 of the wheel house outer 31 is small, it is possible to secure a space for defining the fourth closed cross section C4 along the outer overhang 33.

In addition, the reinforcing member 37 cooperates with the outer overhang 33 and the outer flange 34 to define the fourth closed cross section C4 in the substantially triangular shape. Accordingly, even in the case where a force in an inward-falling direction acts on the rear wheel house 30, it is possible to prevent the fourth closed cross section C4, which is defined by the reinforcing member 37, from being modified to a matchbox shape, and thus it is possible to avoid twisted deformation of the rear wheel house 30.

The wheel house inner 32 includes: the inner overhang 35 that overhangs inward in the vehicle width direction; and the inner flange 36 that extends upward from the inner end in the vehicle width direction of the inner overhang 35 and is joined to the outer flange 34 in the surface contact state. The reinforcing member 37 includes the opening 37a that communicates between the inside and the outside of the fourth closed cross section C4. In this way, after the fourth closed cross section C4 defined by the reinforcing member 37 is defined, the opening 37a is used as a work hole for the welding electrode to perform so-called close joining of the outer flange 34 and the inner flange 36, and thus rigidity can be improved.

A joined portion between the outer flange 34 and the inner flange 36 is disposed in a manner to correspond to the opening 37a when seen in the side view. Accordingly, it is possible to easily join the outer flange 34 and the inner flange 36 via the opening 37a.

The reinforcing member 37 includes the plurality of the openings 37a, and, of the openings 37a, the bead 37b is formed between the respective adjacent openings 37a. Accordingly, by maintaining the rigidity of the reinforcing member 37, it is possible to secure workability of joining work while increasing rigidity of the closed cross section in the substantially triangular shape.

The beads 37b are formed to be substantially orthogonal to the outer overhang 33 when seen in the side view. Thus, it is possible to further increase the rigidity in the vehicle width direction of the reinforcing member 37.

The reinforcing member 37 couples the rear end of the side sill 1 and the lower end of the outer reinforcement 25, and constitutes a part of the first ring-shaped structure S1, which continues from the rear door opening edge Er and is substantially orthogonal to the vehicle width direction, together with the closed cross section defined by the side sill 1, the closed cross section defined by the A pillar 21, which extends in the body vertical direction along the front door opening edge Ef, the closed cross section defined by the roof side rail 10, and the closed cross section defined by the C pillar 23, which extends in the body vertical direction along the rear door opening edge Er. In this way, a load received by the rear wheel house 30 can be dispersed to the first ring-shaped structure S1 that constitutes a portion around the rear door opening edge Er. Thus, it is possible to suppress vibrations of the body.

Next, a description will be given for a modified embodiment in which the embodiment described above is partially modified.

1) In the first embodiment, the description has been given for the example of the FR vehicle of a hatchback type that includes the vertically-installed engine. However, the present invention may be adopted for an FF vehicle of a sedan type that includes a laterally-installed engine. The present invention can be adopted for any type of vehicles regardless of a drive type, a body type, and the like.

2) In the first embodiment, the description has been given for the example of the reinforcing member that includes the opening and the bead. However, neither the opening nor the bead is essential. One of the opening and the bead may not be provided, or both of the opening and the bead may not be provided. The numbers, shapes, and the like of the opening and the bead can be set appropriately.

3) In the first embodiment, the description has been given for the example in which the lower half portion of the side panel is integrally formed with the outer flange of the wheel house outer. However, the lower half portion of the side panel may integrally be formed with the inner flange. In addition, it is also possible to constitute the lower half portion of the side panel by a member other than the rear wheel house.

4) In addition to the above, those skilled in the art can implement a mode, in which various modifications are added to the embodiment, or a mode, in which the embodiments are combined, without departing from the gist of the present invention, and the present invention includes such modified modes.

DESCRIPTION OF REFERENCE CHARACTERS

1: Side sill
23: C pillar
25: Outer reinforcement
31: Wheel house outer
32: Wheel house inner
33: Outer overhang
34: Outer flange
35: Inner overhang
36: Inner flange
37: Reinforcing member
37a: Opening
37b: Bead
S1: First ring-shaped structure
C1: First closed cross section
C4: Fourth closed cross section
V: Vehicle

The invention claimed is:

1. A vehicle side body structure comprising:
a rear wheel house configured to include a rear wheel house outer and a rear wheel house inner;
a side sill extending forward from a front end of the rear wheel house outer;

a pillar extending in a body vertical direction along a rear door opening edge from an intermediate portion in a body front-rear direction of the rear wheel house outer, wherein the wheel house outer includes:
an outer overhang that overhangs outward in a vehicle width direction; and
an outer flange that extends upward from an inner end in the vehicle width direction of the outer overhang, a reinforcing member is provided to cooperate with the outer overhang and the outer flange so as to define a closed cross section in a substantially triangular shape, and the reinforcing member couples a rear end of the side sill and a lower end of a pillar outer member of the pillar, and constitutes a part of a side ring-shaped structure, which continues from the rear door opening edge and is substantially orthogonal to the vehicle width direction, together with a closed cross section defined by the side sill, a closed cross section defined by a front pillar, which extends in the body vertical direction along a front door opening edge, a closed cross section defined by a roof side rail, and a closed cross section defined by the pillar, which extends in the body vertical direction along the rear door opening edge.

2. The vehicle side body structure according to claim 1, wherein the wheel house inner includes:
an inner overhang that overhangs inward in the vehicle width direction; and
an inner flange that extends upward from an inner end in the vehicle width direction of the inner overhang and is joined to the outer flange in a surface contact state, and the reinforcing member includes an opening that communicates between inside and outside of the closed cross section.

3. The vehicle side body structure according to claim 2, wherein
a joined portion between the outer flange and the inner flange is disposed in a manner to correspond to the opening when seen in a side view.

4. The vehicle side body structure according to claim 2, wherein
the reinforcing member includes a plurality of the openings, and, of the plurality of the openings, a high-rigid portion is formed between the respective adjacent openings.

5. The vehicle side body structure according to claim 3, wherein
the reinforcing member includes a plurality of the openings, and, of the plurality of the openings, a high-rigid portion is formed between the respective adjacent openings.

6. The vehicle side body structure according to claim 4, wherein
the high-rigid portion is a bead that is formed in a substantially orthogonal manner to the outer overhang when seen in the side view.

7. The vehicle side body structure according to claim 5, wherein
the high-rigid portion is a bead that is formed in a substantially orthogonal manner to the outer overhang when seen in the side view.

* * * * *